US011612828B2

(12) United States Patent
Kocking

(10) Patent No.: US 11,612,828 B2
(45) Date of Patent: Mar. 28, 2023

(54) FLYING DISK(S) WITH HANDLE

(71) Applicant: Evans Walter Abarzua Kocking, Denver, CO (US)

(72) Inventor: Evans Walter Abarzua Kocking, Denver, CO (US)

( * ) Notice: Subject to any disclaimer, the term of this patent is extended or adjusted under 35 U.S.C. 154(b) by 0 days.

(21) Appl. No.: 17/016,261

(22) Filed: Sep. 9, 2020

(65) Prior Publication Data

US 2022/0072442 A1    Mar. 10, 2022

(51) Int. Cl.
*A63H 33/18* (2006.01)
*B64C 39/06* (2006.01)

(52) U.S. Cl.
CPC ............ *A63H 33/18* (2013.01); *B64C 39/06* (2013.01)

(58) Field of Classification Search
CPC ......... A63H 33/18; A47B 49/004; A47F 5/02; B64C 39/06
See application file for complete search history.

(56) References Cited

U.S. PATENT DOCUMENTS

| 1,570,651 | A | * | 1/1926 | Topping | A47F 5/04 |
| | | | | | D6/677.3 |
| 2,289,212 | A | * | 7/1942 | Rinnela | A43D 117/00 |
| | | | | | 211/131.1 |
| 3,082,572 | A | * | 3/1963 | Knox, Jr. | A63H 27/12 |
| | | | | | 446/46 |
| 3,181,811 | A | * | 5/1965 | Maksim, Jr. | B64C 39/06 |
| | | | | | 244/73 R |
| 3,508,360 | A | * | 4/1970 | Williams | A63H 27/12 |
| | | | | | 446/46 |
| 3,608,739 | A | * | 9/1971 | Duboff | A47F 5/05 |
| | | | | | 211/40 |
| 3,802,117 | A | * | 4/1974 | Engelhardt | A63H 1/30 |
| | | | | | 446/46 |
| 3,814,431 | A | * | 6/1974 | Callahan | A63B 65/08 |
| | | | | | 473/590 |
| 4,134,229 | A | * | 1/1979 | Lehman | A63H 33/26 |
| | | | | | 446/47 |
| 4,182,073 | A | * | 1/1980 | Tabet | A63H 33/18 |
| | | | | | 473/588 |
| 4,216,962 | A | * | 8/1980 | Flemming | A63B 65/08 |
| | | | | | 473/590 |
| 4,253,269 | A | * | 3/1981 | Sullivan | A63H 33/18 |
| | | | | | 446/46 |

(Continued)

*Primary Examiner* — John A Ricci
(74) *Attorney, Agent, or Firm* — Leyendecker & Lemire, LLC

(57) ABSTRACT

This invention is a type of flying disc. It has very special features that makes it unique and an innovation. To the flying disc part one can add a handle, thus, making it a flying disc with a handle protruding downwards from the center of the flying disc part. To this flying disc with a handle, one can add many features like: an overhang, a dome, lights, sound devices, solar panels, computer, buttons, light sensors, speakers, TV screen, meteorological instruments, remote control, drone capabilities, flaps, wings, propellers, etc. Also, this flying disc with a handle rotates like a top on various surfaces. Thus, it is a flying disc and a top in one. To the flying disc with a handle, one can add or take off parts, like extensions, handle, and flying disc parts to create bigger or more interesting flying discs, as shown in the drawings.

41 Claims, 15 Drawing Sheets

(56) References Cited

U.S. PATENT DOCUMENTS

| | | | | |
|---|---|---|---|---|
| 4,334,385 A * | 6/1982 | Melin | A63H 33/18 473/588 |
| 4,337,950 A * | 7/1982 | Gidge | A63F 9/0278 473/588 |
| 4,752,267 A * | 6/1988 | Layman | A63H 33/18 D21/443 |
| 4,778,428 A * | 10/1988 | Wield | A63H 33/18 446/485 |
| 5,055,080 A * | 10/1991 | Cwalinski | A63H 33/18 446/46 |
| 5,195,916 A * | 3/1993 | Her | A63H 33/18 473/589 |
| 5,319,531 A * | 6/1994 | Kutnyak | A63H 33/18 473/588 |
| 5,906,529 A * | 5/1999 | Spais | A63B 65/08 446/36 |
| 5,934,966 A * | 8/1999 | Ward | A63B 65/10 446/46 |
| 6,106,355 A * | 8/2000 | Hoerner | A63H 33/18 446/46 |
| 6,193,620 B1 * | 2/2001 | Tarng | A63B 67/00 473/465 |
| 7,223,150 B2 * | 5/2007 | Chernick | A63H 33/22 446/175 |
| 8,272,917 B2 * | 9/2012 | Davis | B64C 39/024 446/37 |
| 8,459,474 B2 * | 6/2013 | Sagel | A47B 49/006 211/144 |
| 8,550,014 B1 * | 10/2013 | Mariani | A47G 19/00 108/150 |
| 8,784,152 B2 * | 7/2014 | Busse | A63H 33/18 446/46 |
| 9,873,064 B1 * | 1/2018 | Adkins | A63H 33/18 |
| 9,936,805 B2 * | 4/2018 | McGregor | A47F 5/02 |
| 10,086,309 B2 * | 10/2018 | Yamada | A63H 33/18 |
| 10,813,475 B2 * | 10/2020 | Stephens | A47F 5/0892 |
| 2006/0183576 A1 * | 8/2006 | Lindsey | A63H 33/26 473/570 |
| 2010/0279579 A1 * | 11/2010 | Michelsen | A63H 33/18 446/46 |
| 2013/0225032 A1 * | 8/2013 | Abarzua-Kocking | A63H 33/18 446/46 |
| 2015/0201262 A1 * | 7/2015 | Balbach | H04R 1/028 381/334 |
| 2018/0021630 A1 * | 1/2018 | Monnin | A63H 33/26 473/570 |

* cited by examiner

HAVING A HANDLE AT THE CENTER OF THE DISK AND DOWNWARDS IS WHAT MAKES MY FLYING DISC UNIQUE!!!

Now this is a handle!!! Long, wide, and fits the hand comfortable and fully.

This picture shows the flying disk rotating in a person's hand. It shows the main two parts, the handle part and the disk part.

FLYING DISK(S) WITH HANDLE

The Frisbee was created by an American inventor, Walter Frederick Morrison, in 1948. Fred Morrison and his wife liked to play by throwing upside-down cake pans to each other on the beaches in California. Throwing cake or pie pans wasn't new, but Fred Morrison had the idea to make a plastic version. An investor named Warren Franscioni partnered with Morrison to get the idea off the ground.

After years of selling his flying discs at fairs and shows, Fred Morrison made a deal with a toy company, Wham-O Manufacturing, in 1957. The founders of Wham-O heard college students use a different name for the discs. The "Frisbie Baking Company" made pies in Bridgeport, Conn., and throwing their pie pans had been happening on college campuses for years. Every pie pan was stamped, "Frisbie's Pies". Wham-O registered the trademark name "Frisbee", and added it to the discs in 1958. After that, Frisbees began flying off the shelves, and became a popular toy all over the world.

The first name for the plastic toy Fred Morrison sold in 1948 was the "Flyin' Saucer". The first sighting of saucer-shaped Unidentified Flying Objects (UFOs) in the United States happened in 1947, and everyone was talking about them. Fred Morrison even gave people "space licenses" with each Flyin' Saucer they bought.

In 1955, Fred Morrison changed the design, and started selling discs as "Pluto Platters". This name stayed on the discs until 1964.

In 1964, Ed Hendrick at Wham-O started developing Frisbee sports. He changed the Frisbee design to make a "Professional Model" for tournaments.

The team sport Ultimate Frisbee started around 1965, and first became popular at high schools. Frisbee golf was created by Ed Hendrick around 1976. Many other disc sports have been created, which has increased the popularity of Frisbees.

DETAILED DESCRIPTION

Figure 1:
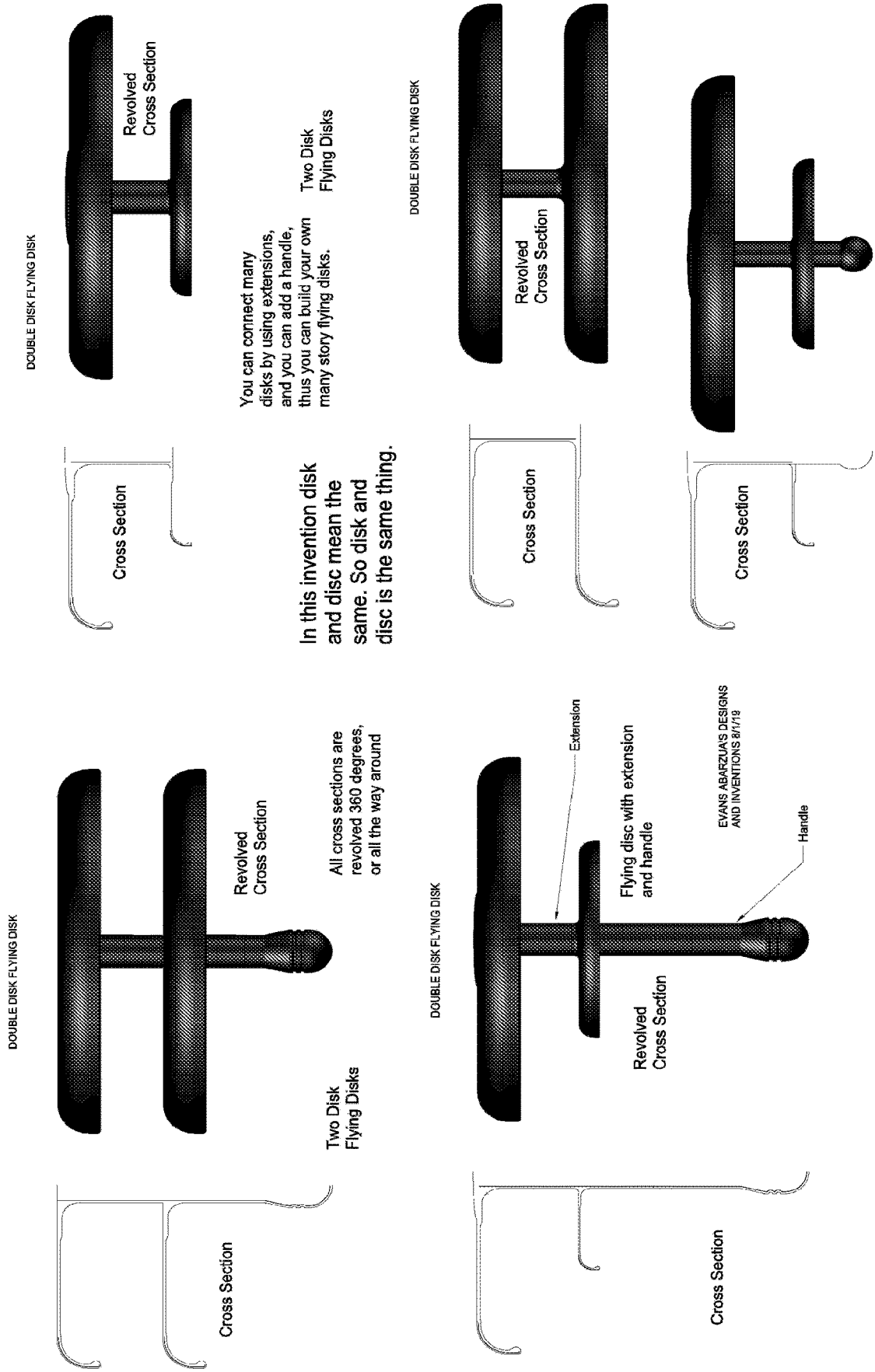
FIG. 1 includes several views of flying disks according to one or more embodiments of the present invention.

This invention is composed of many parts or sections.

First of all this invention is a normal flying disk or Frisbee as we have seen for many decades, but this one has special qualities and features, like adding and having a handle, having a dome, and be able to assemble your own flying disk by the use of flying disc parts, rod/extension parts and handle parts.

One can attach a handle to the flying disk or Frisbee. Thus, it becomes a flying disk with a handle protruding downwards from the center of the flying disk part, as seen in the drawings. The handle part can be permanently attached to the flying disc part, or it can come off and on. The handle can also be screwed-in and screwed-out or it can be attached with glues, latch, or any other type of attachment.

Also, one can attach a second flying disk and extension to the flying disc with a handle, and be able to create a two flying disk toy or configuration, or a double flying disk as seen in my drawings. One can create a double-disk flying disk through the use of a rod or extension as seen in the drawings. One can attach the extension permanently to the two flying disks, or the extension can come off and on, and be able to disassemble and assemble the double flying disk. Also, when all parts are permanently attached to each other is a fixed configuration, the flying disc does not come apart.

By adding another extension and another flying disk to the two disc configuration, one can create a triple flying disc. Disk and disc mean the same thing in these specifications and invention. To have a three disk configuration, one can attach the three disks, extensions and handle permanently or attach-on and detach-off. So one can do and undo the three flying disk configuration and it can screw on or off. Or the configuration can be one solid fixed configuration that cannot come apart by being glued or fused together.

To the three flying disk configuration, one can add another disk and rod in order to make it a four-disk configuration as seen in the drawings. Again here one can attach all four flying disks, rods, and the handle. The handle can also be ignored in all these configurations as well, so they can have the handle or not. All the configurations in this invention can have the handle or not necessarily.

To the four flying disk configuration, one can add another disc and rod and make this flying disk into a five-disk configuration. Using five disks, handle and extensions, one can create a five flying disk configuration as seen in the drawings. And one can keep adding disks and rods to this toy and make it even bigger. Thus, this toy can grow from a one flying disk configuration, to a two, three, four, five, and more flying disk configurations. It is fun for kids because they can have fun putting together a many disk configuration flying disk toy, or create many flying disks from a many disk configuration flying disk.

A dome can be added to the top of the flying disk as shown in the drawings. This dome has many purposes, to make the flying disk more rigid and stronger, for better looks, for better air flow, and to better support the flying disk when a handle or rod is attached to it, and to prevent breakage of the flying disk. The dome makes the flying disk stronger all together.

At the bottom of the flying disk part is a lip or overhang sticking inward toward the center of the flying disk and goes all around the rim of the disk part, as seen in the drawings. Having this lip or overhang is very important because it makes the bottom of the rim of the flying disk wider and not thin and sharp. The wider the better for this lip, because it will prevent finger damage and the flying disk will be smoother and easy on the fingers when at play.

The exterior of the flying disk can be covered by a softer, foam, or rubbery material than the flying disk's material. This softer or rubbery material is a shock absorber for the flying disk, especially if it has some thickness to it. Other shock absorber materials can be used. Most flying disks are made of plastic and the hands can hurt after a while of play.

Putting this shock absorbing material on the exterior of the disk is essential for a gentle and soft play. Thus, the flying disk will be strong in the inside but soft on the outside surface.

The handle of the disc can have grooves, ridges, and a ball at the bottom, and the handle can be tapered as shown in the drawings.

The interior of the handle of the flying disk can hollow, filled with material, or solid. The handle can carry sound devices, lights, batteries, tiny computer and circuit board, memory story device, music radio, antenna, internet, etc. The handle of the disk can be opened to put things inside as shown in the drawings. The handle can have holes and indentations. The handle can carry thermometer, humidity reader, altitude and pressure reader.

The flying part can carry solar cells, batteries and lights. Thus, the flying disk can light up at night and recharge during the day. The flying disk part can have sound devices, speakers a plug to charge or to download information. The flying disk part can have an on-off switch to turn on and off the lights and radio or sound devices. The flying disk part can have batteries. The flying disk part can have a light sensor. This sensor can determine when it is getting dark, so it will turn the flying disk's lights on in order to play at night and be able to see the flying disk. Similar to the sensors for the lights in a car, that come on automatically when is getting dark. Also, the flying disk part can have a temperature reader, humidity reader, altitude reader. So, when a player is playing with the flying disk, the player is able to tell how hot it is, how humid it is, and how high above sea level a player is, and the pressure sensor to determine the atmospheric pressure.

The flying disk can have propellers, fans like a drone. This flying disk can be a fusion of a drone and a flying disk. Thus, the flying disk can be controlled like a drone and can be guided to a player's hand through a remote control. The fans can help the flying disk fly longer and with a specific direction, so players can be really far apart. The drone capabilities in the flying disk can even guide the flying disk back to a player's hands, and can make the flying disk avoid obstacles', etc. And one can play alone, by programming the flying disk to return to a player's hand. Nice, so a player can throw the flying disk in any way and it can return to you hand. Also, one can add any type of propulsion for the disk to fly longer, jet propulsion or any other propulsion.

As a futuristic component to this flying disk. This flying disk can be made huge, at a great scale in order to carry people in the handle as shown in the drawings. It can even be an interplanetary/interstellar space ship with a shield, and with some imagination.

The flying disk can have flaps, propulsion gills, and wings for direction, steering and flying. These flaps, gills, and wings can guide the flying disk to a specific target. These flaps, gills, and wings can be placed anywhere in or on the disk configuration. The flops, propulsion gills and wings can rotate to give the flying disk direction and even lift. Thus, this flying disk can even take off from the ground by it-self and land in a player's hand, by the use of remote control and G.P.S. guidance.

There can be a system using the remote control and drone capabilities of the flying disk and a special remote device in your hand that can guide the flying disk directly to a player hand or to your hand, and also by the use of G.P.S. Thus, a player can throw the flying disc in the worse possible way and even in the wrong direction. And, this system with the aid of the drone capabilities will guide the flying disk to the other player's hand. Therefore, it is the perfect play every time. The flying disk always reaches the players hands, no matter how bad the disk has been thrown, this system can be achieved through the use of G.P.S. and other systems. The flying disk will know your coordinates and will go to your specific location.

Notice that the handle of the flying disk has bones, and a backbone or spine for a stronger handle part and flying disc part. Just like we have a bones and back bone to make us strong. This flying disk handle and disk part can have bones, and backbones for strength. This back bone will make the handle and any other part of the flying disk stronger and more durable.

Between the handle part of the flying disk and the flying disk part, where the two parts come together, there is a thicker and bigger area. This area is to make sure the flying disk does not break at this weak point where the two parts come together. The thicker this area, the more durable the flying disk. Also, the curvature of this area is important for strengthening the flying disc.

The bottom of the handle has an extra support area. Because the bottom of the handle of the flying disk usually hits the ground first, this area has been made with extra support to avoid and withstand wear and tear. Also, the flying disk can rotate on surfaces like a top wearing off the bottom of the handle; this area has to be thicker, stronger and more durable as seen in the drawings.

When this flying disk is in a flying disk and handle configuration. This flying disk can be a flying disk and a top in one. It can fly like a flying disk and it can rotate on surfaces like a top.

When you have a flying disk and handle configuration. The flying disk part can rotate dependently or independently from the handle part. Meaning the flying disk part can be rotating, while the handle stays fixed not moving. Or the other way around, the handle can be rotating and the disk part can be fixed and not moving. Or the whole thing can be one rigid fused configuration where the handle part has to rotate if the flying disk part is rotating. Both parts rotate or stop at the same time in a fixed configuration. One can make a fixed configuration with the flying disk part and handle part by fusing, using glue, screwing tight or latch both parts together.

The flying disk also has a clock and timer to tell the time, tell minutes and hours of play per day, per week, per month, per year and so on.

The flying disk is a phone so you can talk to people. The flying disk has a microphone so you can record and send messages to the other players.

The flying disk is also a flash light so you can light your way at night. The flash light can work thanks to the batteries and solar panels.

The flying disk also has a TV or LCD screen so a player can also watch movies, internet, Facebook, Youtube, emails, etc. when playing with the flying disk.

The flying disk part has a hollow section that goes all around the rim of the disk part as shown in the drawing. This hollowed section can be used as a shock absorber and to lower the mass and weight of the flying disk so it can fly further.

So, a five-disk configuration flying disk, can come apart to create other fun flying disk's configurations.

The flying disc can have a self-standing system that can keep the flying disc standing upright without the use of external help. Thus, if the flying disc is rotating like a top on a surface, when it stops rotating, the flying disc does not fall over, it will remain upright.

The flying disc has a propeller at the bottom of the handle as shown in the drawings. This propeller will steer and give direction to the flying disc.

The drawings show cross sections and fully revolved cross sections, revolved 360 or all the way around. Revolving 360 degrees or all the way around gives a full look at the final flying disc, or the final product.

The handle of the flying disc will look round looked at from the bottom of the disc.

The flying disc can have lights everywhere that can light up in different patterns like Christmas lights and be programmed. The flying disc can be made big like a car that can carry and fly people around. The flying disc part can be made wide with windows to carry passengers with the drone capabilities. The handle part can become a capsule that can carry people and fly.

There can be a set of different size flying disc parts, handle parts, and rod/extensions. With this set a player can create many awesome configurations of flying discs, or assemble a big assembly. Playing and joining the parts together is fun and a creative process.

A firm and full hold of the flying disc's handle, is when all the fingers are wrapped around the handle as seen in the drawing.

The handle part and the flying disc part can be cut into sections. There can be one section rotating one way, and another section rotating in the opposite way. Thus, a flying disc part can be cut into many sections that can rotate independently of one another. Also, the handle part can be broken into sections. One section can rotate one way while the other section remains still. The flying disc part and the handle part can be cut into many sections.

Referring to FIG. 1: this drawing shows my invention of "the flying disk with a handle", and different configurations that you can make by the use of flying disks, rods or extensions, and by the use of handles. Some combinations do not include handles. This drawing shows many models in a two flying disk configuration. This drawing also shows cross sections and revolved 360 degrees flying disk configurations. Disc and disk mean the same thing in this invention.

Figure 2:
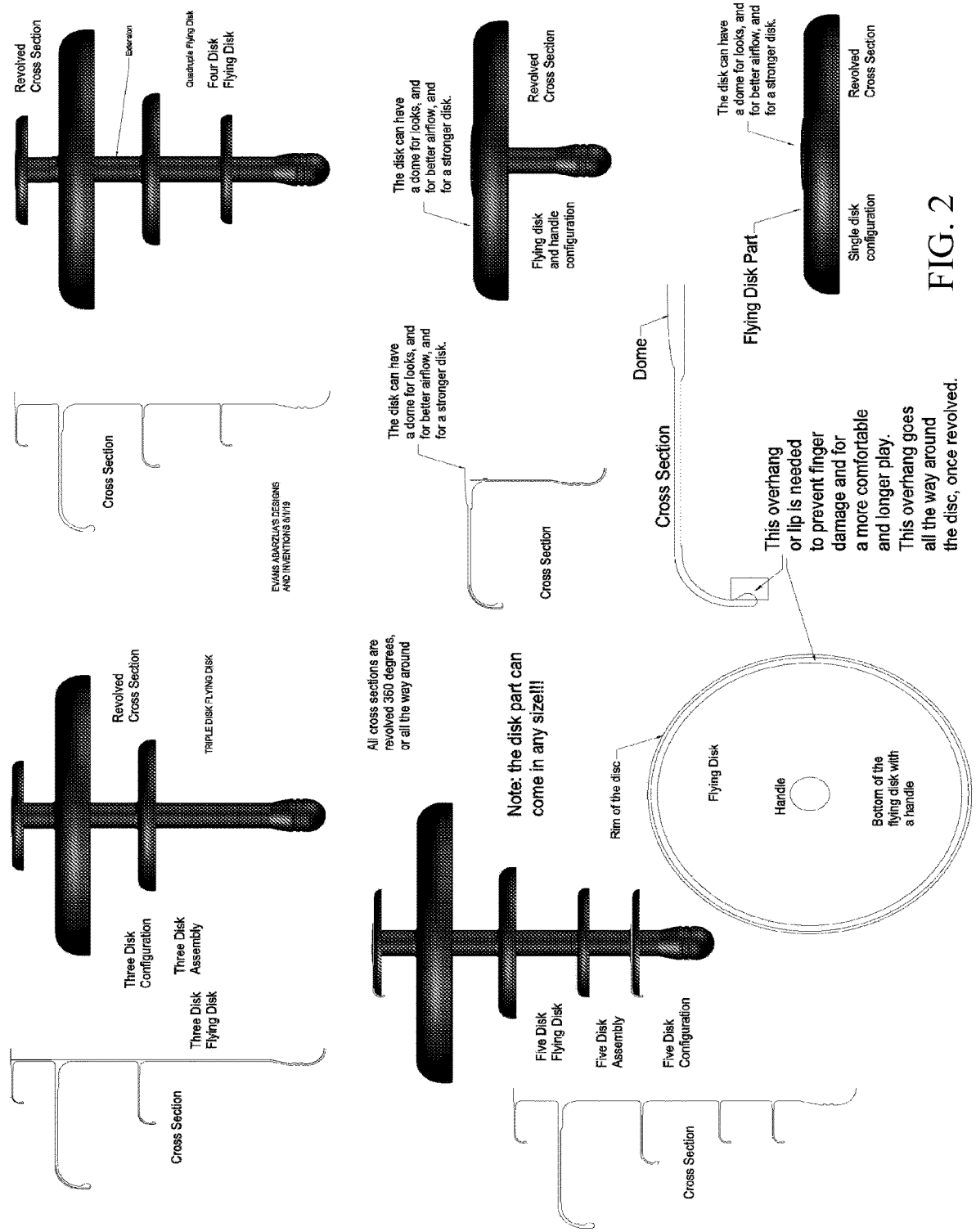
FIG. 2 includes several views of flying disks according to one or more embodiments of the present invention.

Referring to FIG. 2: this drawing shows one, three, four, and five flying disk configurations using extensions, flying disk parts, and handle parts. And how a player can make many flying disk configurations from a five-disk assembly. Also, there is a flying disk with no handle, but it has a dome on top. Many designs have a dome on top for a stronger flying disk and for looks. This drawing also shows a lip or overhang in the interior of the rim of the flying disk part. This lip or overhang is ideal because it prevents finger damage when playing. The bigger this overhang, the less finger damage a player will endure. Thus, this drawing shows different configurations and features of my flying disk.

Figure 3:
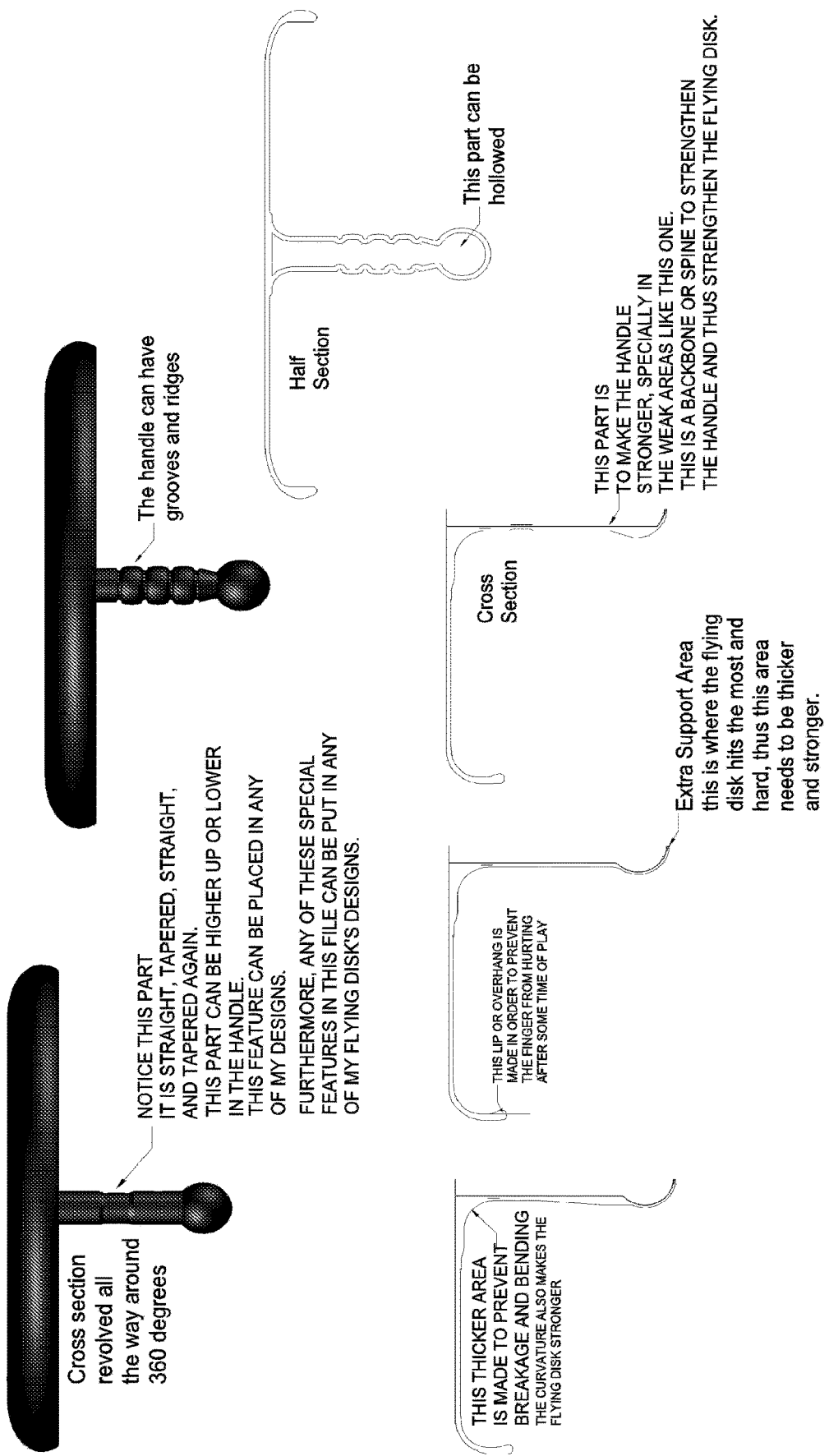
FIG. 3 includes several views of flying disks according to one or more embodiments of the present invention.

Referring to FIG. 3: this drawing shows flying disks with different handles, and how handles can have grooves, have tapered sections, have ridges, a ball at the bottom of the handle, etc. This drawing also shows spines or back bones in the flying disks to make them stronger, stronger handle, stronger extensions and flying disk parts. Also, this drawing shows the flying disk with a handle that has an extra thick area between the flying disk part and the handle part, where the two parts come together. This thicker area is design to make the flying disk stronger, and to prevent breakage at this weak point. Furthermore, this drawing shows the bottom of the handle being stronger by being thicker. Many times the flying disc with a handle will land upright on hard surfaces, banging hard the bottom of the handle or handle part. The bottom of the handle hits the ground hard, so we need to make it stronger by adding thickness and/or hardness to this area.

Figure 4:
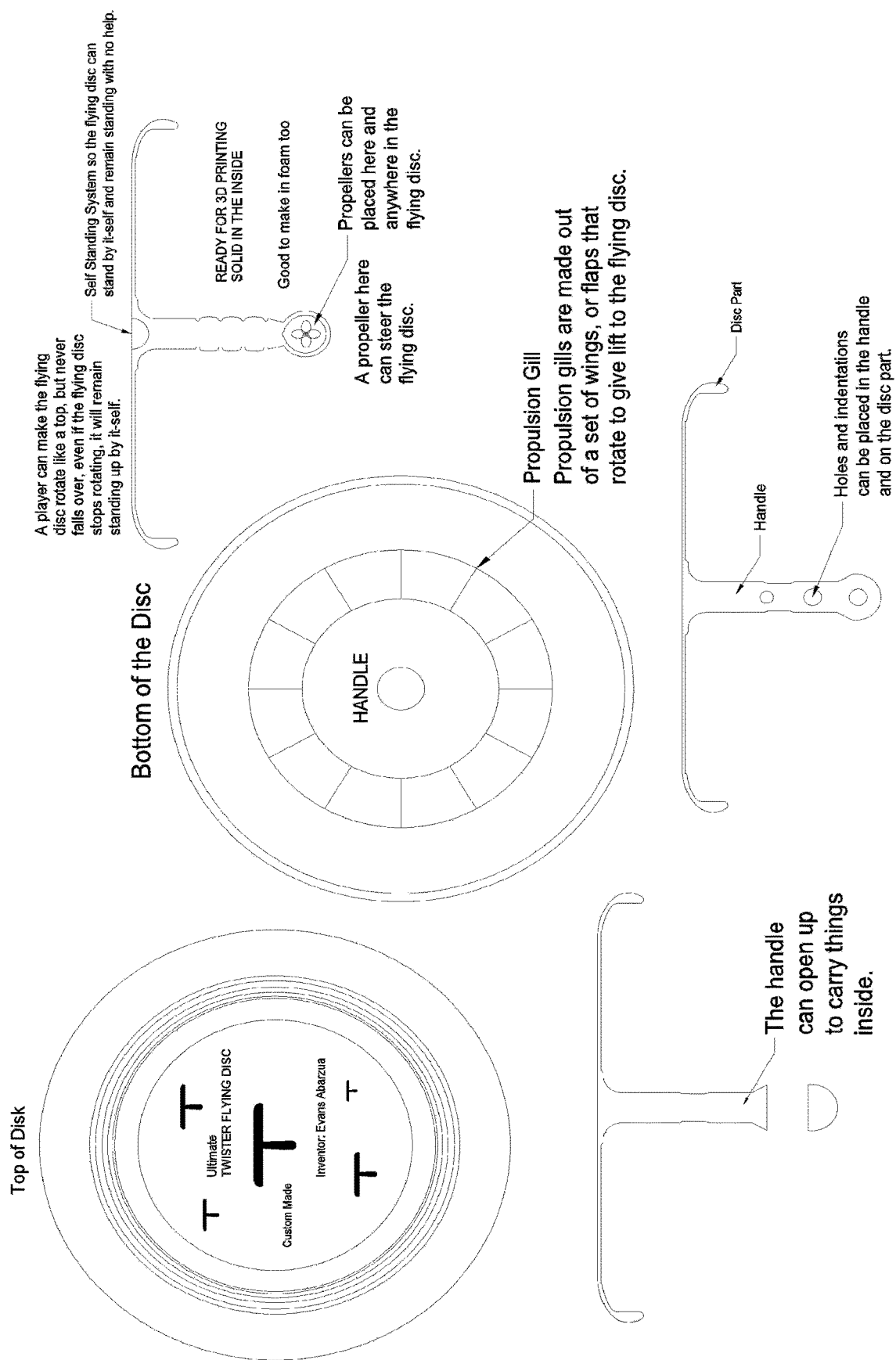
FIG. 4 includes several views of flying disks according to one or more embodiments of the present invention.

Referring to FIG. 4: this drawing shows the top of the flying disk, and the bottom of the flying disk. This drawing also shows the handle part can be hollow in order to put things in it. Thus, the flying disc with a handle can carry things in the handle part. This drawing shows different handle designs, and how you can have holes and indentations in the flying disk part, and in the handle part. Furthermore, this drawing shows that the flying disk can have propulsion gills. A gill is a set of wings, blades or flaps, in this case arranged in a circular way. The flying disc can have many gill sets, not just one. There can be two propulsion circular gill sets rotating in opposite direction to make the flying disc fly in a stable manner. The flying disc can have many propulsion gill sets. Furthermore, this drawing shows that the flying disc with a handle can have a self-standing system so the flying disc can stand by it-self without external help, and not fall over. A player can make the flying disc with a handle rotate like a top, and when it stops rotating, the flying disc with a handle will remain standing up right by it-self. Also, in this drawing we can see that the round part of the handle has propellers for direction and steering. Propellers can be placed anywhere in or on the flying disc.

Figure 5:
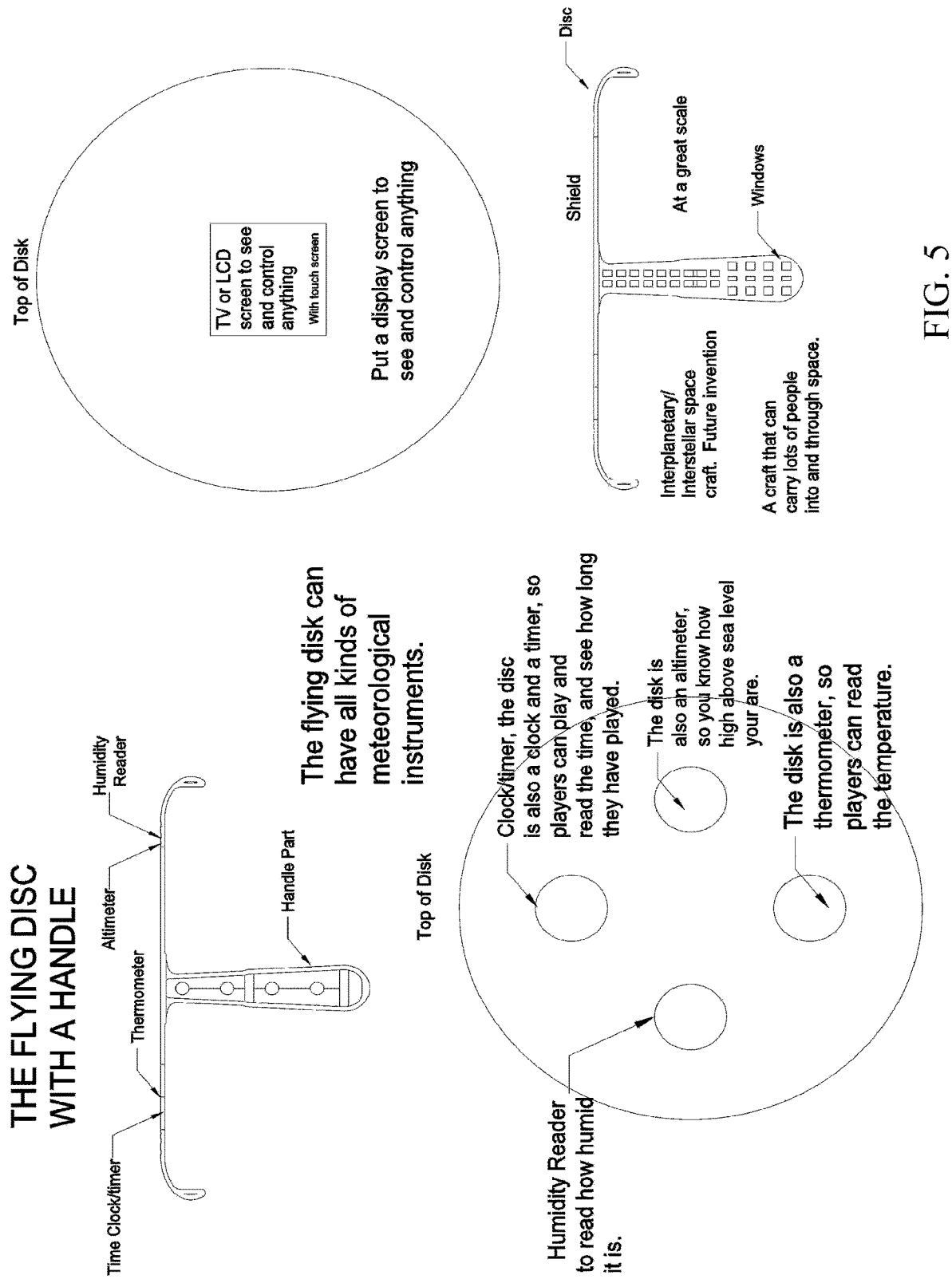
FIG. 5 includes several views of flying disks according to one or more embodiments of the present invention.

Referring to FIG. 5: this drawing shows the flying disc with a handle having a time clock/timer in order to be able to read the time, and the timer can tell how long a player has been playing. This clock/timer can record minutes of playtime, thus a player can keep track of play-time in the short or long run. The flying disc can have a thermometer in order to read the temperature, and also be able to record temperatures. The flying disc can have a humidity reader to be able to tell how humid it is and record it. Furthermore, the flying disc can have an altimeter to be able to tell how high above sea level a player is, and be able to record it. A player can also record the trajectory of the flying disc, and be able to record it with different altitudes. All kinds of meteorological instruments can be placed in or on the flying disc. The flying disc can have a TV or LCD screen or touch screen to see and control anything. Thus, you can check your email from the flying disc or see movies. For a futuristic design, the flying disc with a handle can be made giant, at a big scale in order to carry many people into space as an interplanetary/ interstellar space craft with windows in the handle part and a shield on the disc part.

Figure 6:
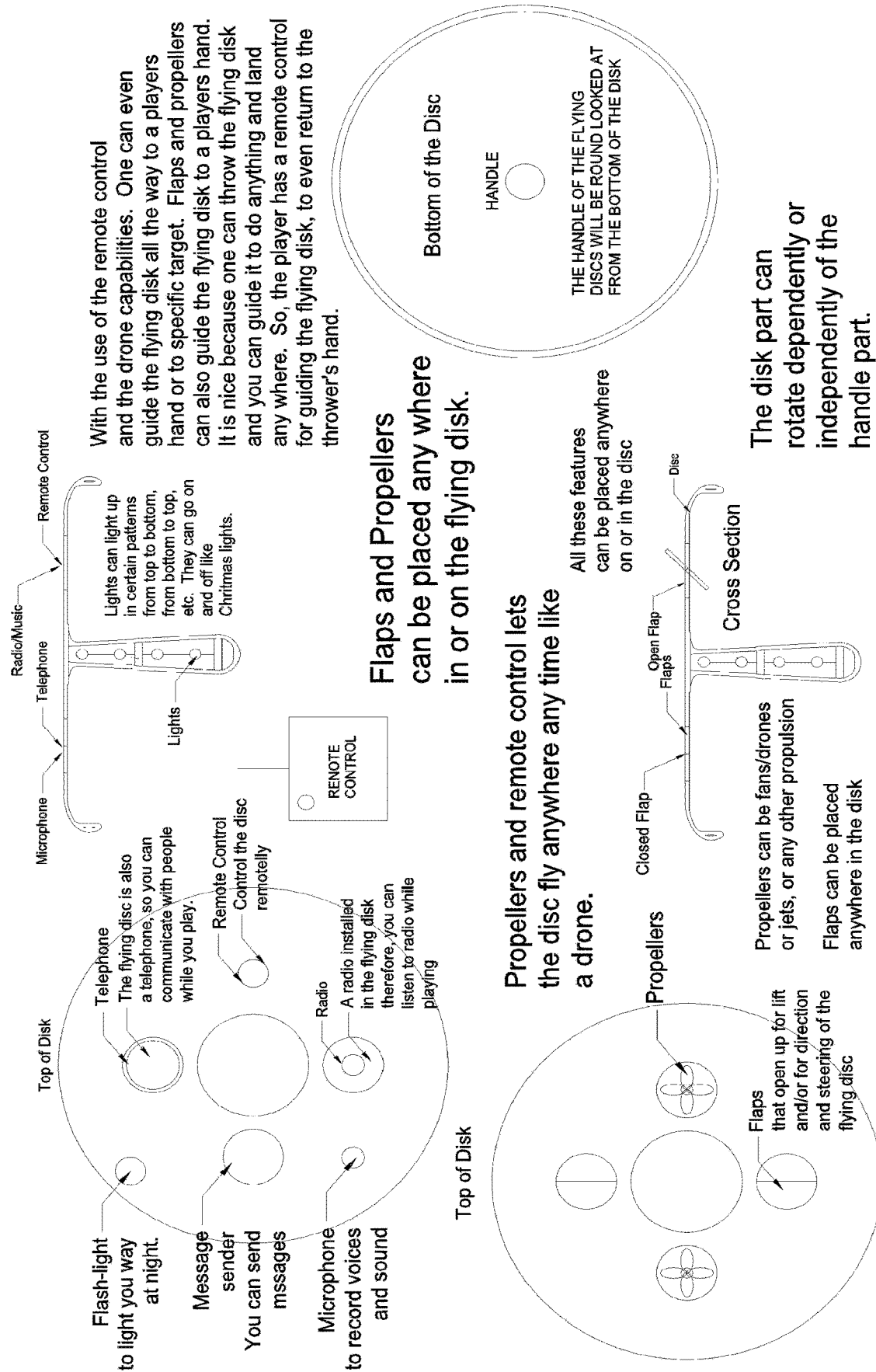
FIG. 6 includes several views of flying disks according to one or more embodiments of the present invention.

Referring to FIG. 6: this drawing shows that the flying disc with a handle and all the other configurations can have can have all the features discussed in the description of drawings. All the flying disc configurations can have a flashlight, TV screen, thermometer, gill sets, wings and flops, drone capabilities, etc. And all these features can be placed anywhere in or on all the flying disc configurations. This drawing shows that the flying disc can have a flashlight to light the player's way at night. Also, this drawing shows that you can record voices and sounds through the use of a microphone. A player can record a message and send it to the other player to hear it and to respond. Thus, a player can send recorded voice messages or written messages. The flying disc with a handle and all other configurations can have a radio to hear music, news, events, etc. This drawing shows that the flying disc with a handle and all other configurations can have can have a remote-control system that can remotely controls the flying disc. Controlling the flying disc by remote control is great because a player can throw the flying disc even in the worst possible way, and the flying disc can be controlled and delivered perfectly to the other player's hand. The flying disc has a computer on board and G.P.S. global positioning system to be able to remote control the flying disc to a specific location and/or coordinates. Each player can have a remote-control device so when activated, the flying disc will fly to that remote-control device. Thus, a player throws the flying disc, the other player activates the remote-control device, and the flying disc will fly to that player's hand. This drawing shows that the flying disc with a handle and all other configurations can have drone capabilities. Meaning the flying disc is a flying disc and a drone in one. Thus, the flying disc can have propellers like a drone. Propellers can be placed anywhere in or on the flying disc. Propellers can be fans/blades like a drone, or jets, or any other type of propulsion. Having drone capabilities is great because a player can control the flying disc, and even make it take off from the ground and land at a particular location. A telephone can be placed in or on the flying disc. Thus, a player can receive and make phone calls from the flying disc. The flying disc can have lights anywhere. This drawing shows that the flying disc can have lights in the handle part, and these lights can light up and go on and off like Christmas lights, and in different patterns. The players can see the flying disc at night when it is lit. Also, there is a sensor that can sense when it is getting dark. Like the sensors for the car's head lights that go on automatically when getting dark. The players can play continuously with no interruption till dark, because the flying disc lights up automatically when getting dark thanks to the sensors, and players can see the flying disc at night. The disc part can rotate dependently or independently from the handle part. Thus, the disc part can be rotating, and the handle part can be still, not rotating. All the parts of all the configurations of flying discs can rotate dependently or independently of one another. The flying disc can have flops that open up for lift, direction and 4 steering. The handle of the flying disc will look round or circular looked at from the bottom. The bottom view shows the handle round or circular.

Figure 7:
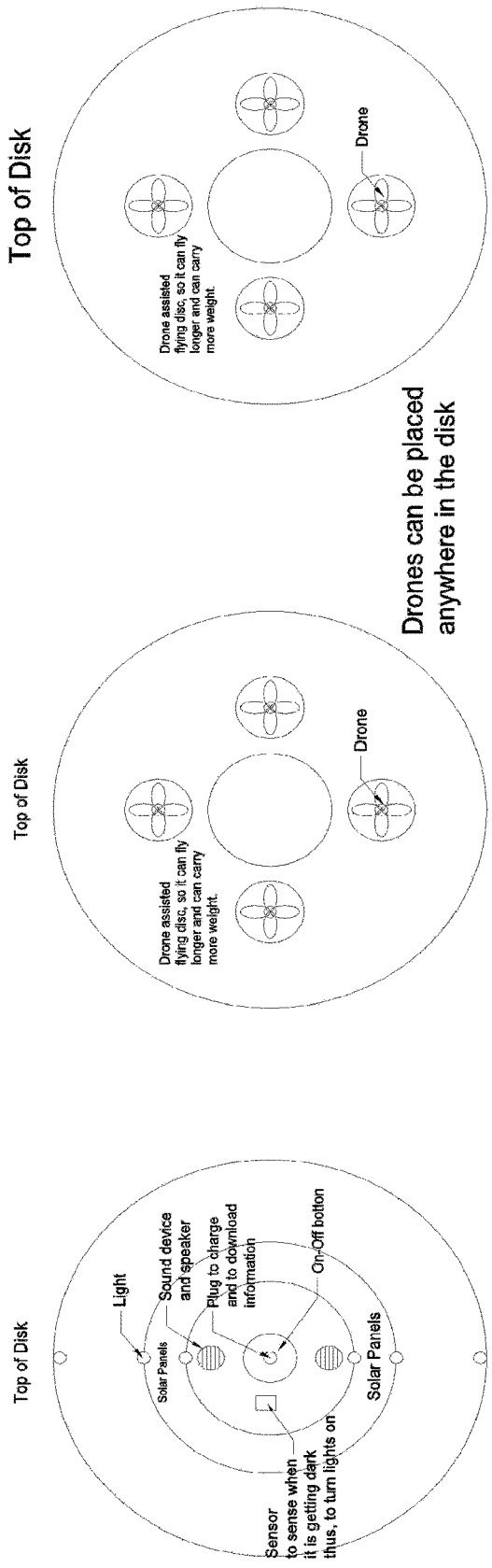
FIG. 7 includes several views of flying disks according to one or more embodiments of the present invention.
Figure 7:
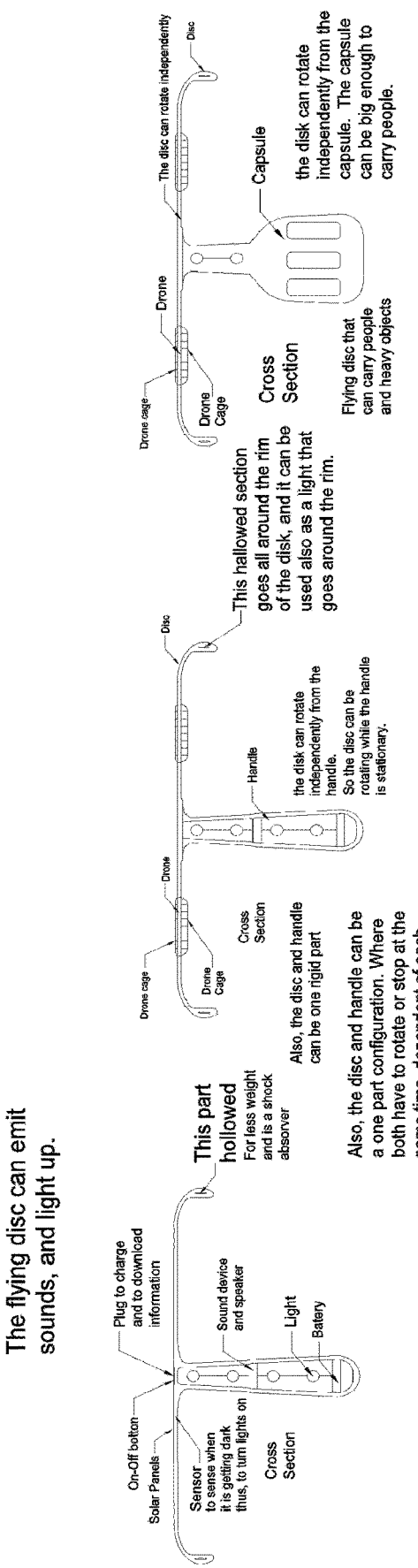

Referring to FIG. 7: this drawing shows the top view of the flying disc where drone propellers can be placed, or propellers can be placed anywhere. Drone assisted flying discs can fly anywhere and land in any location, and fly for a long time. Having a flying disc and a drone in one is great because the flying disc can be control by remote-control to fly and go anyplace. Furthermore, this drawing shows that the flying disc can have lights in or on the flying disc part, as well as in or on the handle part. The flying disc can have battery for power storage. The flying disc can have sound devices and speakers to hear sound and music. A player can make the flying disc sound like a train, birds, music, airplane, UFO, etc. The flying disc can have solar panels anywhere, especially on the flying disc part. Thus, players can be playing during the day and recharge the flying disc's batteries for the night. Solar panels are very helpful for the flying disc because they can be very light in weight and produce enough energy to light up the flying disc, and start other devices. Solar panels recharge the flying disc thus players can play at night and not have to plug in the flying disc to an outlet. A sensor in the flying disc can tell when it is getting dark so the flying disc can light up automatically, and players can play at night. There is an off/on switch or button to turn the disc on or off. There is a plug to charge the batteries of the flying disc from an electric outlet. This plug can also be used to upload and download information into and from the flying disc. The rim of the flying disc part can have a hollowed section that goes all the way around the rim. This hollowed section reduces the amount of material used for making the flying disk, and it can also be a shock absorber. The drone propellers can have cages thus a player does not grab the propeller's blades when playing, and to avoid injury. The disc part can rotate independently or dependently from the handle part. The flying disc can be made big like a car to carry people in flight. Thus, the handle part can be made bigger like a capsule with windows to carry people flying around places and the world. The flying disc without the handle, just the flying disc part can carry a battery at the center of the flying disc part to light up and start the flying disc.

Figure 8:
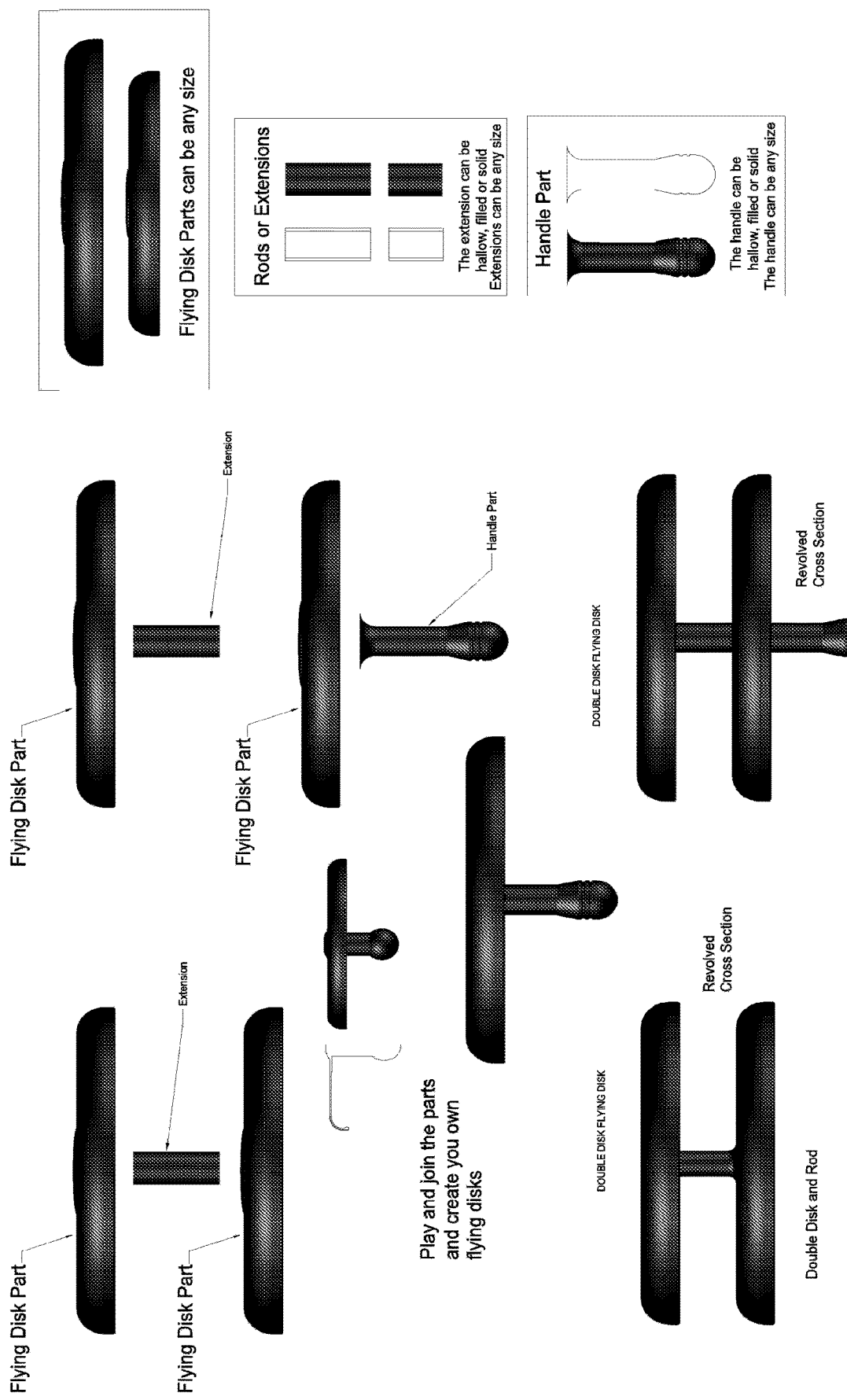
FIG. 8 includes several views of flying disks according to one or more embodiments of the present invention.

Referring to FIG. 8: this drawing shows many types of configurations of the flying disc. The drawing shows how a player can put together and join the parts to create new configurations of flying discs. With a set of handle parts, flying disc parts, and rod/extension parts of different sizes, a player can put together all kinds of combinations of interesting flying discs. All these configurations of flying discs can come apart or do not come apart. The parts can come apart through the use of threads, latches, etc. or, the parts can be fixed together by glue, fusing, etc. Thus, players can take apart flying disc configurations in order to make new configurations, or the flying discs do not come apart. Flying disc parts, handle parts, and rod/extensions can come in any size.

Figure 9:
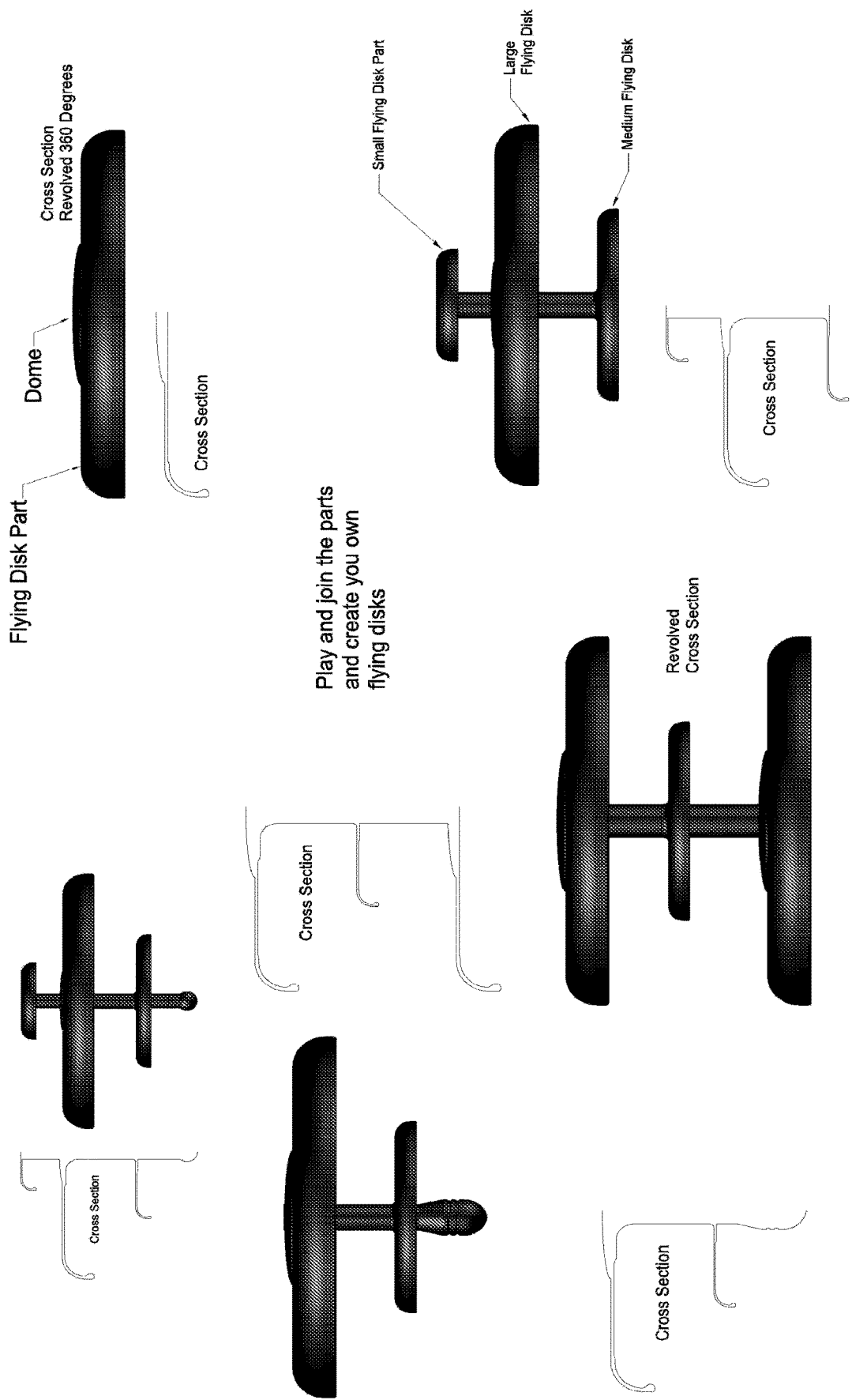
FIG. 9 includes several views of flying disks according to one or more embodiments of the present invention.

Referring to FIG. 9: this drawing shows different cool combinations of flying disks, using flying disc parts, handle parts, and rod/extension parts. This page shows nice designs of flying disks and how you can go from a cross section to a complete flying disc by revolving the cross section 360 degrees or all the way around. In addition, this page shows different sizes of flying disk parts, handle parts, and rod/extension parts. This drawing shows a dome on top of the flying disc part. This dome is design for looks and to make the flying disc stronger, and more rigid.

Figure 10:
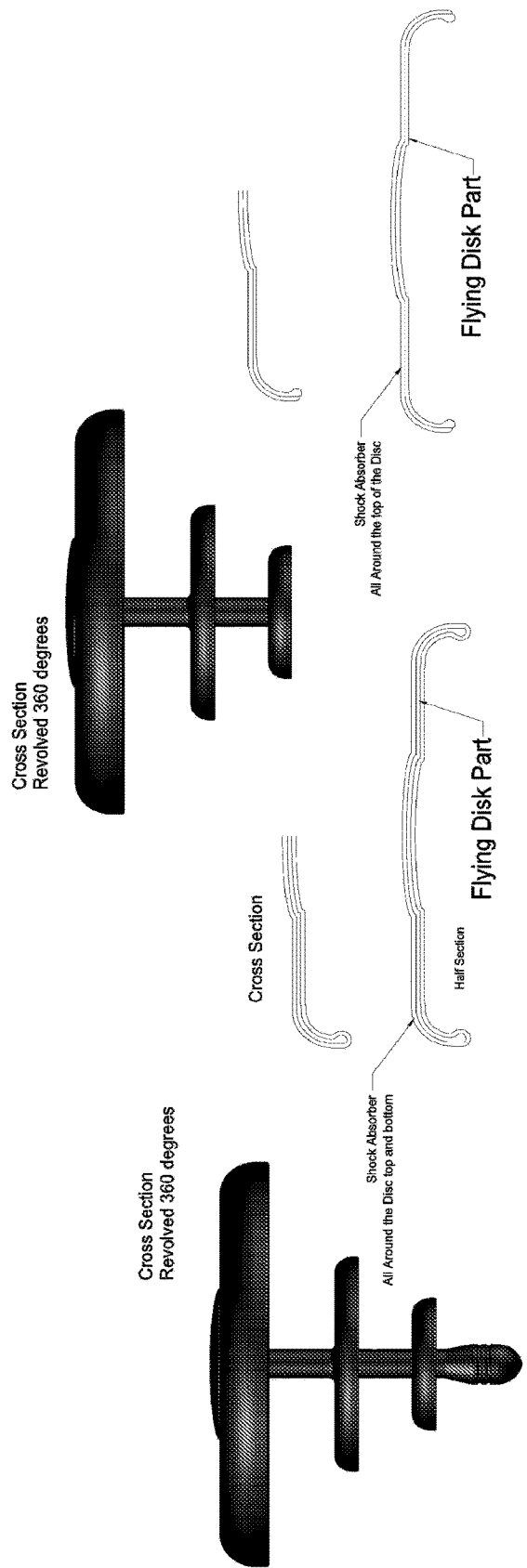
FIG. 10 includes several views of flying disks according to one or more embodiments of the present invention.
Figure 10:
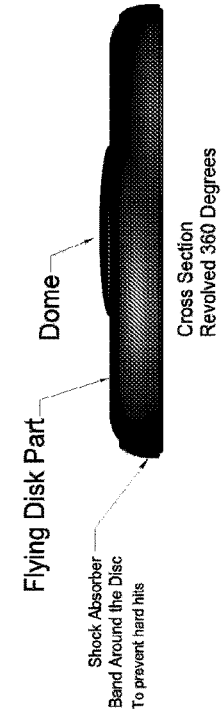
Figure 10:
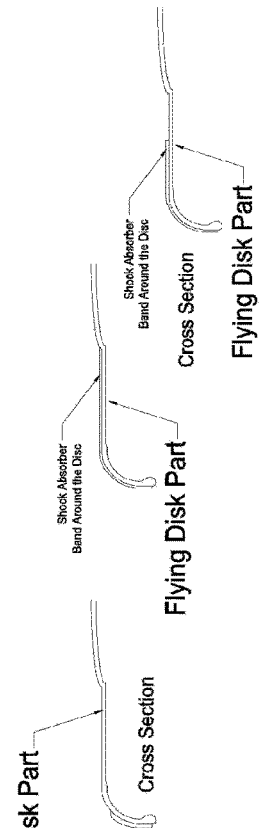
Figure 10:
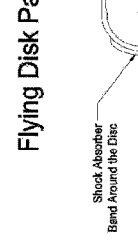

Referring to FIG. 10: this drawing shows nice triple flying disks designs with three disks, rods, and handle. Also, this page shows shock absorber areas and shock absorber systems and coatings. The idea is to put shock absorbing material around the flying disk to prevent breakage of the flying disk, and hard hits to the hands and body of the players. Thus, this page shows different ways the shock absorbing material can be placed on and around the flying disk. For all these reasons shock absorbing material can and should be placed on and around the flying disk, and specially on and around the flying disk part. The shock absorbing material can be placed in strategic places for best results as shown in the drawings.

Figure 11:
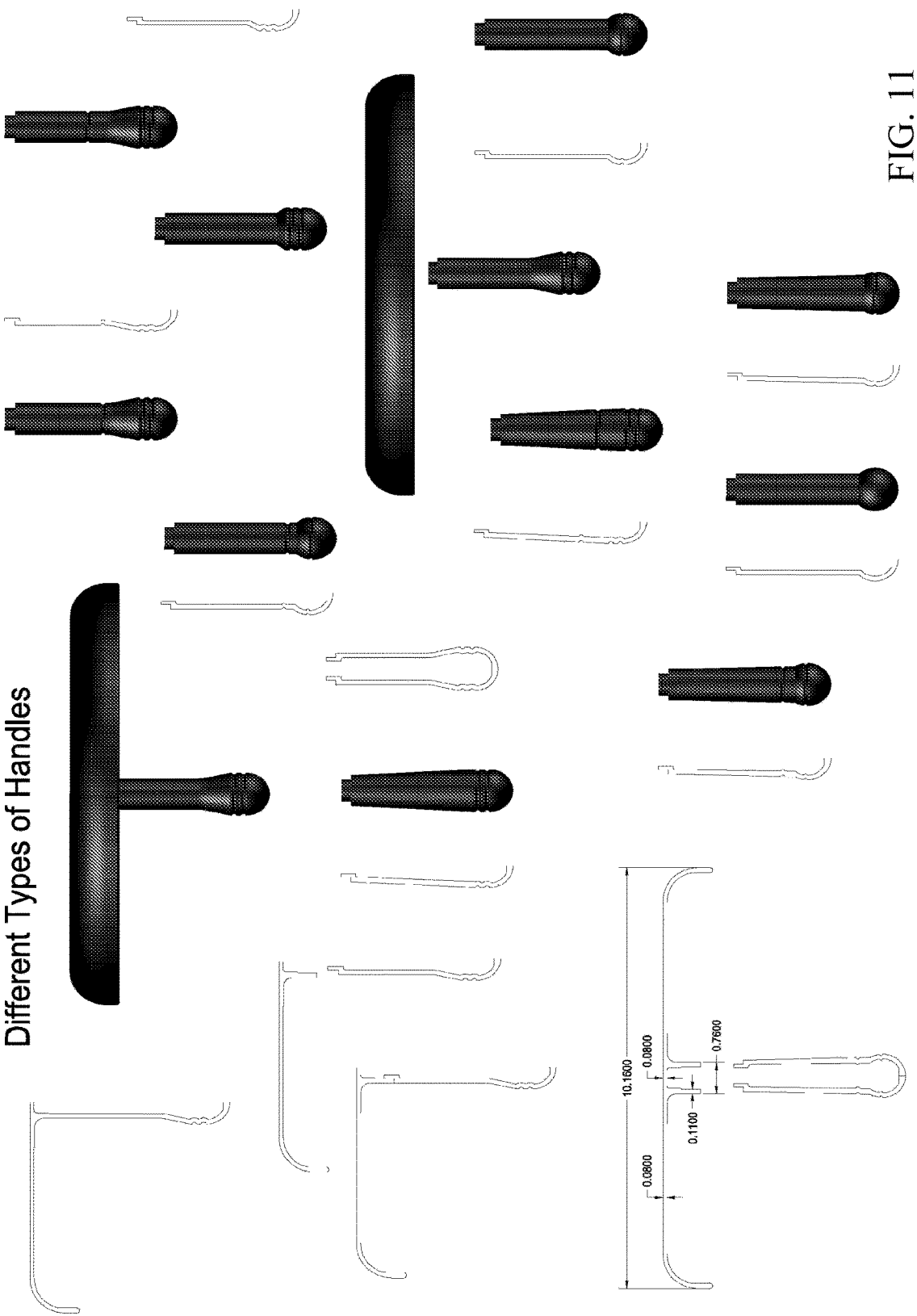
FIG. 11 includes several views of flying disks according to one or more embodiments of the present invention.

Referring to FIG. 11: this drawing shows many types and designs of flying disk's handles or handle parts. Also, this drawing shows how the handle part hooks or attaches to the flying disk part in order to create a one-piece flying disk and handle. This drawing shows cross sections of the handle parts, and the 360 revolved handle parts as well. And this drawing shows how half of a handle part can make a full handle, and even in two colors.

Figure 12:
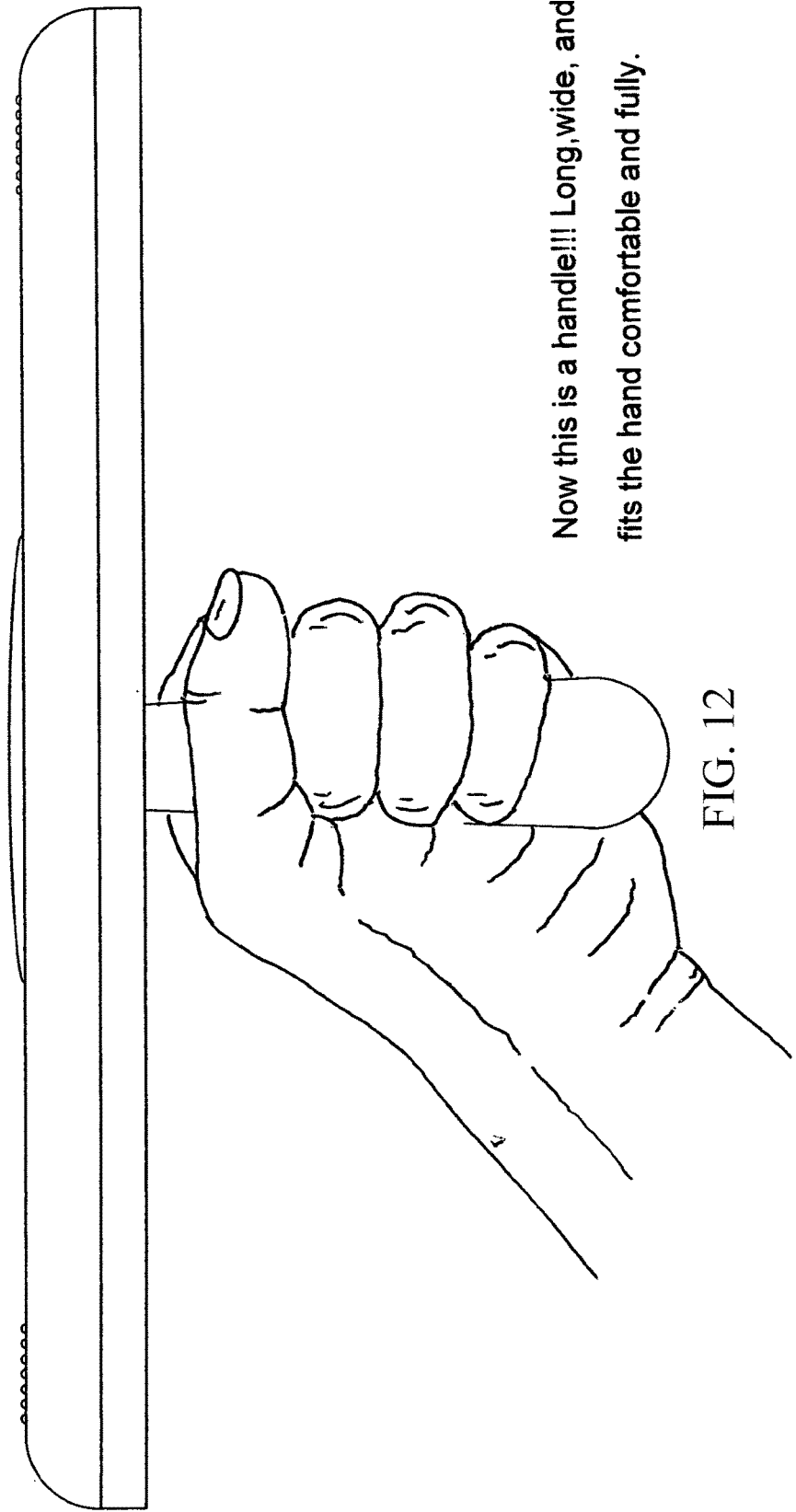
FIG. 12 includes a side view of a flying disk according to one embodiment of the present invention.

Referring to FIG. 12: this drawing shows a hand holding the flying disk by the handle firmly and fully. Where all the fingers are holding the handle part is best, and a more secure hold.

Figure 13:
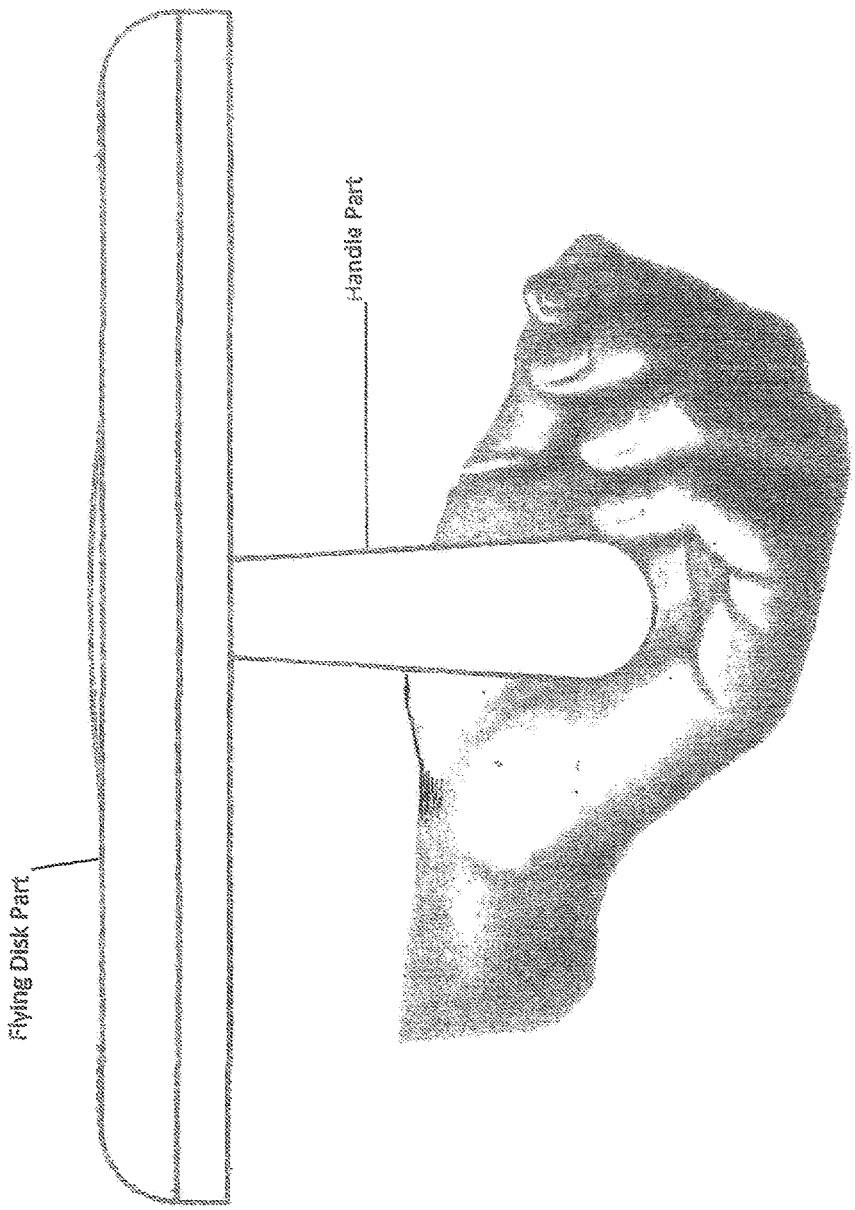
FIG. 13 includes a side view of a flying disk according to one embodiment of the present invention.

Referring to FIG. 13: this drawing shows the flying disk rotating in a person's hand. It also shows the main two parts, the flying disk part and the handle part.

Figure 14:
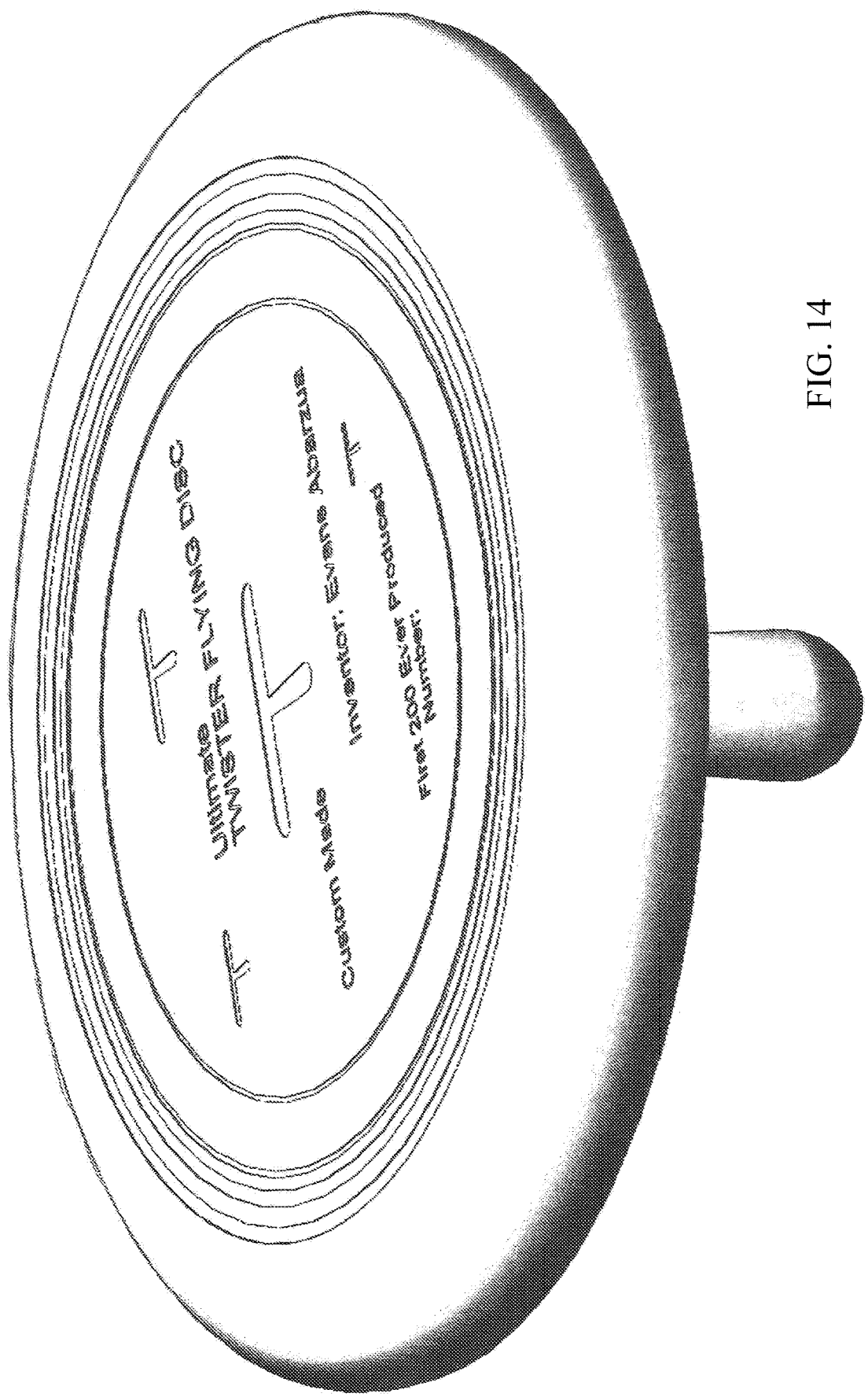
FIG. 14 includes a perspective view of a flying disk according to one embodiment of the present invention.

Referring to FIG. 14: this drawing shows a handle part and a flying disk part configuration flying disk in one, and looked at an angle. This drawing also shows the name of the inventor Evans Abarzua, and one of the names of the flying disc with a handle. The name is "The Ultimate Twister Flying Disc". This configuration flies beautiful and is fun for everyone.

Figure 15:
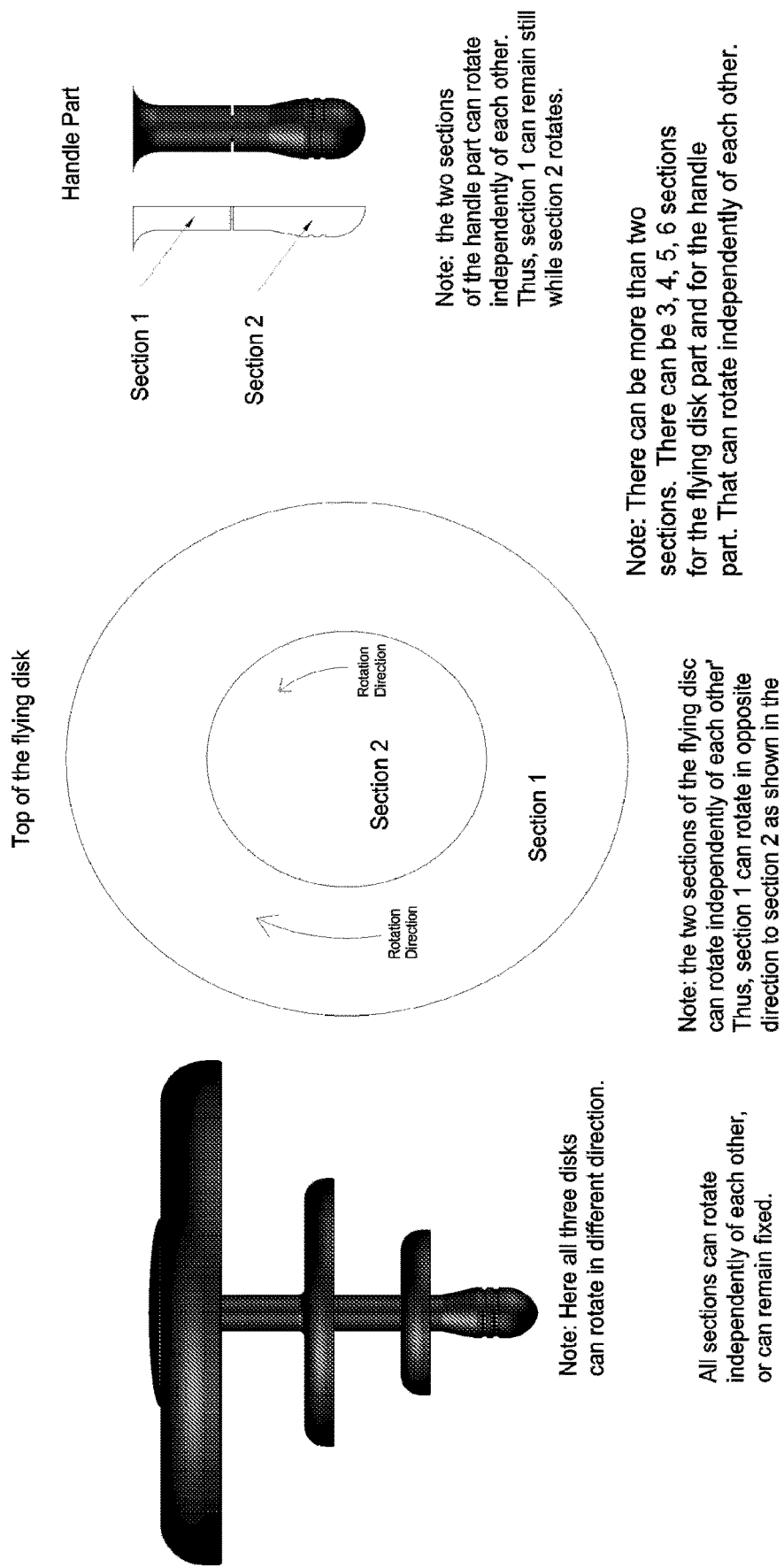
FIG. 15 includes several views of flying disks according to one or more embodiments of the present invention.

Referring to FIG. 15: this drawing shows a three flying disc configuration where all parts can rotate in different directions, or all parts can remain fixed to one another and have to rotate in the same direction. This drawing also shows that the handle part and the flying disc part can be cut into sections that can rotate in different directions. The top of the flying disc part shows two sections that can rotate in different directions. Also, the handle part can have two or more sections that rotate in different directions. Thus, the handle part and the flying disc part can be broken up into two or more sections that can rotate independently of one another. Or one section can remain still while the other sections rotate or vice versa.

The invention claimed is:

1. A flying disk comprising:
a first circular disk body having an upper surface, a lower surface, and a downwardly extending perimeter rim;
a second circular disk body having an upper surface, a lower surface, and a downwardly extending perimeter rim;
an extension extending downwardly from a center of the first circular disk body to a center of the second circular disk body; and
a handle extending downwardly from a center of the second circular disk body, the handle (i) tapering and (ii) including a spherically shaped bulge at a distal end.

2. The flying disk of claim 1, wherein the handle is integral to the second circular disk body.

3. The flying disk of claim 1, wherein the handle is removably coupled to the second circular disk body.

4. The flying disk of claim 1, wherein the second circular disk body, the extension, and the first circular disk body rotate independently of the handle.

5. The flying disk of claim 1, wherein the extension is removably coupled to the first circular disk body and the second circular disk body.

6. The flying disk of claim 1, wherein the first circular disk body rim and the second circular disk body rim each have a shock absorbing band.

7. The flying disk of claim 1, wherein a diameter of the first circular disk body is larger than a diameter of the second circular disk body.

8. The flying disk of claim 1, wherein a diameter of the first circular disk body is equal to a diameter of the second circular disk body.

9. The flying disk of claim 1, the flying disk further including:
a third circular disk body having an upper surface, a lower surface, and a downwardly extending perimeter rim; and
a second extension extending downwardly from a center of the third circular disk to the center of the second circular disk body.

10. The flying disk of claim 9, wherein the second extension is removably coupled to the third circular disk body and the second circular disk body.

11. A kit for a flying disk assembly comprising:
a first circular disk body having a downwardly extending perimeter rim and a first diameter;
a second circular disk body having a downwardly extending perimeter rim and a second diameter;
a third circular disk body having a downwardly extending perimeter rim and a third diameter;
a first extension having a first length, the first extension adapted to removably couple to the first circular disk body, the second circular disk body, and the third circular disk body;
a second extension having a second length, the second extension adapted to removably couple to the first circular disk body, the second circular disk body, and the third circular disk body; and
a handle, the handle adapted to removably couple to the first circular disk body, the second circular disk body, and the third circular disk body;
wherein the handle (i) tapers and (ii) includes a spherically shaped bulge at a distal end.

12. The kit of claim 11, wherein the first diameter, the second diameter, and the third diameter are all different.

13. The kit of claim 11, wherein (i) the first diameter and the second diameter are equal, and (ii) the third diameter is different from the first diameter.

14. The kit of claim 11, wherein the first length is equal to the second length.

15. The kit of claim 11, wherein the first length is different than the second length.

16. A kit for a flying disk assembly comprising:
a first circular disk body having a downwardly extending perimeter rim and a first diameter;
a second circular disk body having a downwardly extending perimeter rim and a second diameter;
a first extension adapted to removably coupled to the first circular disk body and the second circular disk body; and
a handle, the handle adapted to removably couple to the first circular disk body and the second circular disk body;
wherein the handle (i) tapers and (ii) includes a spherically shaped bulge at a distal end.

17. A flying disk comprising:
- a circular disk body having an upper surface, a lower surface, and a downwardly extending perimeter rim;
- a handle extending downwards from the center of the disk body, the handle (i) including a thicker area with a curvature where the handle mates with the disk body, and (ii) being coupled to the disk body by a female-to-male connection; and
- a shock absorbing band around an exterior of the downwardly extending perimeter rim.

18. The flying disk of claim 17, wherein the disk body can rotate independent from the handle.

19. The flying disk of claim 17, wherein the flying disk has drone capabilities.

20. The flying disk of claim 17, wherein the handle is solid.

21. The flying disk of claim 17, wherein the flying disk has solar cells.

22. The flying disk of claim 17, wherein the handle has grooves.

23. The flying disk of claim 17, wherein the flying disk has internet capabilities.

24. The flying disk of claim 17, wherein the flying disk powers on and off.

25. The flying disk of claim 17, wherein the downwardly extending perimeter rim includes a lip around an inside of the rim.

26. The flying disk of claim 17, wherein the flying disk has lights in the disk body.

27. The flying disk of claim 17, wherein the handle has one or more tapered sections.

28. The flying disk of claim 17, wherein the flying disk plugs in for power and to share information.

29. The flying disk of claim 17, wherein the flying disk has remote control capabilities.

30. The flying disk of claim 17, wherein the disk body includes a thicker area with a curvature where the disk body mates with the handle, the thicker area and curvature being variable in size.

31. The flying disk of claim 17, wherein the flying disk includes a flash light.

32. The flying disk of claim 17, wherein the flying disk has a dome in the disk body.

33. The flying disk of claim 17, wherein the handle includes lights.

34. The flying disk of claim 33, wherein the flying disk further includes a light sensor for determining when to turn the lights on.

35. The flying disk of claim 17, wherein the flying disk makes sounds.

36. The flying disk of claim 17, wherein the flying disk has a global positioning system.

37. The flying disk of claim 17, wherein the flying disk has a television screen.

38. The flying disk of claim 17, wherein the disk body and the handle come together in order to create a flying disk with a handle extending downwards from the center of the disk body.

39. The flying disk of claim 17, wherein the handle includes a capsule big enough to carry people.

40. The flying disk of claim 17, wherein the handle has ridges.

41. The flying disk of claim 17, wherein the handle is hollow.

\* \* \* \* \*